United States Patent
Ito et al.

(10) Patent No.: US 11,690,317 B2
(45) Date of Patent: Jul. 4, 2023

(54) CUTTER BLADE OF MOWER

(71) Applicant: Kubota Corporation, Osaka (JP)

(72) Inventors: Hirokazu Ito, Sakai (JP); Motosumi Shiotsuki, Sakai (JP)

(73) Assignee: Kubota Corporation, Osaka (JP)

( * ) Notice: Subject to any disclaimer, the term of this patent is extended or adjusted under 35 U.S.C. 154(b) by 616 days.

(21) Appl. No.: 16/692,463

(22) Filed: Nov. 22, 2019

(65) Prior Publication Data

US 2020/0367430 A1 Nov. 26, 2020

(30) Foreign Application Priority Data

May 21, 2019 (JP) ................................ 2019-095355

(51) Int. Cl.
| A01D 34/00 | (2006.01) |
| A01D 34/73 | (2006.01) |
| A01D 34/82 | (2006.01) |
| A01D 101/00 | (2006.01) |

(52) U.S. Cl.
CPC ............ *A01D 34/73* (2013.01); *A01D 34/82* (2013.01); *A01D 2101/00* (2013.01)

(58) Field of Classification Search
CPC ...... A01D 34/826; A01D 34/73; A01D 34/68; A01D 34/82
See application file for complete search history.

(56) References Cited

U.S. PATENT DOCUMENTS

| 3,369,354 | A | | 2/1968 | Freedlander et al. | |
| 4,559,769 | A | * | 12/1985 | Seyerle | A01D 34/73 56/13.4 |
| 5,209,052 | A | * | 5/1993 | Carroll | A01D 34/73 56/DIG. 17 |
| 6,301,868 | B1 | * | 10/2001 | Siplinger | A01D 34/73 56/255 |
| 6,360,517 | B1 | * | 3/2002 | Ishimori | A01D 43/063 56/320.1 |
| 6,415,591 | B1 | * | 7/2002 | Tylka, Sr. | A01D 34/73 56/255 |
| 6,487,840 | B1 | * | 12/2002 | Turner | A01D 34/73 56/295 |
| 6,655,119 | B2 | * | 12/2003 | Hasei | A01D 34/826 56/DIG. 17 |

(Continued)

FOREIGN PATENT DOCUMENTS

| EP | 3210453 A1 | 8/2017 |
| FR | 2370419 A1 | 6/1978 |

(Continued)

*Primary Examiner* — Hau V Phan
(74) *Attorney, Agent, or Firm* — The Webb Law Firm

(57) ABSTRACT

A cutter blade for a mower is disposed inside a housing of the mower and rotatably driven about a vertical axis. The cutter blade includes a blade body a blade portion provided at least at a part of a rotational direction-wise front end portion of the blade body, and a wind generating portion provided at least at a part of a rotational direction-wise rear end portion of the blade body, the wind generating portion extending more upwards than the blade portion. A thickness of the wind generating portion at the rotational direction-wise rear end portion is smaller at least partially than a thickness of the remaining part of the wind generating portion.

6 Claims, 4 Drawing Sheets

(56) References Cited

U.S. PATENT DOCUMENTS

| | | | |
|---|---|---|---|
| 6,679,039 B2* | 1/2004 | Deschamps | A01D 34/826 56/295 |
| D693,373 S * | 11/2013 | Shiotsuki | D15/17 |
| 10,285,328 B2* | 5/2019 | Kurioka | A01D 34/68 |
| 2002/0152736 A1 | 10/2002 | Hasei et al. | |
| 2007/0289282 A1* | 12/2007 | Yamashita | A01D 42/005 56/320.1 |
| 2008/0072561 A1* | 3/2008 | Koike | A01D 34/667 56/320.2 |
| 2009/0178382 A1* | 7/2009 | Sugio | A01D 34/81 56/6 |
| 2013/0199148 A1 | 8/2013 | Goudeau, Jr. | |
| 2014/0130473 A1 | 5/2014 | Augustine et al. | |
| 2014/0179428 A1* | 6/2014 | Miura | A63F 13/23 463/31 |
| 2015/0033693 A1* | 2/2015 | Ito | A01D 43/077 56/255 |
| 2015/0047308 A1* | 2/2015 | Schreiner | A01D 34/73 56/289 |
| 2015/0082763 A1* | 3/2015 | Nishihara | A01D 34/005 56/289 |
| 2017/0245432 A1 | 8/2017 | Koshimura et al. | |
| 2019/0111789 A1* | 4/2019 | Matsuda | B60L 7/24 |

FOREIGN PATENT DOCUMENTS

| | | |
|---|---|---|
| JP | 59172519 U | 11/1984 |
| JP | 6068936 U | 5/1985 |
| JP | 6237624 A | 8/1994 |
| JP | 2002315418 A | 10/2002 |
| JP | 2005237252 A | 9/2005 |
| JP | 2005312396 A | 11/2005 |

* cited by examiner

CUTTER BLADE OF MOWER

CROSS-REFERENCE TO RELATED APPLICATION

This application claims priority to Japanese Patent Application No. 2019-095355 filed May 21, 2019, the disclosure of which is hereby incorporated by reference in its entirety.

TECHNICAL FIELD

This invention relates to a cutter blade of a mower rotatably driven about a vertical axis inside a housing.

BACKGROUND ART

The cutter blade described above includes a blade portion and a wing generating portion. In operation, grass is cut by the blade portion and wind is generated by the wind generating portion inside the housing for raising the grass with this wind to facilitate cutting thereof or conveying resultant cut grass pieces. The wind generating portion is formed by bending upwards a cutter blade having a certain thickness. And, by enlarging the wind generating portion, it is possible to increase the amount of wind generated, thus increasing the ability of raising and conveying the grass. On the other hand, with this type of cutter blade, there is sometimes generated a negative pressure on the lower face side of the wind generating portion (the rear side with respect to the rotational direction of the cutter blade). If such negative pressure is developed, a vortex will be generated at this negative pressure portion. This may result in turbulence of air flow, which can lead to increase in the rotational resistance for the cutter blade. The larger the wind generating portion, the greater the air flow turbulence which tends to occur, thus, the greater the rotational resistance.

Conventionally, as arrangements for preventing generation of negative pressure on the back side of the wind generating portion, there were known cutter blades disclosed in Patent Document 1 (Japanese Unexamined Patent Application No. 2002-315418) and Patent Document 2 (Japanese Unexamined Patent Application No. 2005-312396). Namely, Patent Document 1 and Patent Document 2 disclose cutter blades in which in the wind generating portion, there is provided a hole portion which establishes communication between the upper face side (the front side with respect to the rotational direction of the cutter blade) and the lower face side of this wind generating portion. As air is communicated from the front face side to the back face side of the wind generating portion via this hole portion formed in the wind generating portion, it is intended to resolve generation of noise associated with the negative pressure while forming the wind generating portion large.

SUMMARY OF THE INVENTION

Problems to be Solved by Invention

However, with the cutter blades disclosed in Patent Document 1 and Patent Document 2, it was necessary to form the hole portion. In forming such hole portion, it is necessary to form the hole portion at a particular location and in a particular shape. This would require high precision and trouble in machining.

Then, in view of the above-described state of the art, the principal object of the present invention is to provide a cutter blade that can suppress rotational resistance through a simple machining.

Solution

According to a characterizing feature of the present invention, there is provided a cutter blade configured to be disposed inside a housing of a mower and rotatably driven about a vertical axis, the cutter blade comprising:

a blade body;

a blade portion provided at least at a part of a rotational direction-wise front end portion of the blade body (i.e. front end portion of the blade body with respect to a rotational direction);

a wind generating portion provided at least at a part of a rotational direction-wise rear end portion of the blade body, the wind generating portion extending more upwards than the blade portion; and a thickness of the wind generating portion at the rotational direction-wise rear end portion being smaller at least partially than a thickness of the remaining part of the wind generating portion.

With this invention described above, as the wind generating portion is formed thinner at its rotational direction-wise rear end portion, the generation area of a negative pressure generated on the rotational direction-wise rear side of the cutter blade is decreased, so that generation of vortex and turbulence of air current associated with generation of negative pressure can be suppressed. Consequently, it is possible to suppress the rotational resistance for the cutter blade due to generation of vortex flow and turbulence of air current.

In the present invention, preferably, the wind generating portion includes a tapered portion having an inclined face which becomes thinner from a position distant by a predetermined distance from the rotational direction-wise rear end portion to the rotational direction-wise rear end of the wind generating portion.

With this inventive arrangement, since the wind generating portion becomes thinner toward its rotational direction-wise rear end portion, an amount of air that flows along the upper face of the cutter blade and an amount of air that flows along the lower face of the cutter blade can smoothly merge. As a result, the vortex and turbulent air flow that is generated on the rotational direction-wise rear side of the cutter blade can be effectively suppressed, so that the rotational resistance for the cutter blade can be suppressed in a favorable manner.

In the present invention, preferably, the inclined face comprises a flat face or a curved face.

With this inventive arrangement, when the inclined face is to be formed, after forming the wind generating portion by the conventional forming method (e.g. bending work), the rotational direction-wise rear end portion of this wind generating portion can be trimmed simply. Thus, no high precision is required, and the inclined face can be formed by such simple step.

In the present invention, preferably, the inclined face is provided at a lower face portion of the wind generating portion.

With this inventive arrangement, as the inclined face is provided at a lower face portion of the wind generating portion, it is possible to prevent decrease in the height of the wind generating portion in the vertical direction. If the inclined face were provided at an upper face portion of the wind generating portion, this would result in decrease in the height of the wind generating portion in the vertical direction, which in turn would lead to reduction in the size of the wind generating portion, eventually reduction in its ability to raise grass or convey cut grass pieces. In order to prevent this, it is needed to increase the wind amount by further increasing the height of the wind generating portion. This would present inconvenience of necessity to implement a design change for the desired increase of the height of the wind generating portion in the vertical direction. Then, by providing the inclined face at a lower face portion of the wind generating portion, it is possible to prevent reduction in the height of the wind generating portion in the vertical direction, namely, reduction in the size of the wind generating portion. Thus, it is possible to avoid reduction in the amount of the wind generated by the wind generating portion, without need for such design change described above.

In the present invention, preferably:

at a lower face portion of the blade body and at least at a part of a lower face portion of the blade portion and a lower face portion of the wind generating portion, there is provided a high strength portion constituted of a material having a higher strength than material of the blade body; and the inclined face is provided at an upper face portion of the wind generating portion.

With the inventive arrangement, a high strength portion constituted of a material having a higher strength than material of the blade body is provided at a lower face portion of the cutter blade, and in addition thereto, the inclined face suppressing the rotational resistance for the cutter blade can be formed on the upper face side of the wind generating portion. Provision of such high strength material on the lower face side of the cutter blade contributes to enhancement of durability, thus making it possible to reduce damage due to cut grass pieces, small stones, etc. at the time of grass cutting work, thus making it possible to extend the service life of the cutter blade. On the other hand, if the inclined face were formed on the lower face side of the wind generating portion for instance, there would arise a need to carry out e.g. a trimming work on the high strength material in order to form the inclined face. However, machining of such high strength material is difficult, so forming of the inclined face is difficult. Further, even if machining of the high strength material is possible, a portion of the high strength material is to be removed for formation of the inclined face. Thus, there will arise inconvenience of improvement of durability due to the high strength material becoming impossible at the machined portion. In contrast, in case the inclined face is formed on the upper face side of the wind generating portion, there is no need to form the inclined face in the high strength material. Therefore, occurrence of such inconvenience as described above can be prevented.

In the present invention, preferably, the blade body, the blade portion and the wind generating portion are formed integral.

With the inventive arrangement, in comparison with a case where the blade body, the blade portion and the wind generating portion are formed separately, as a step of welding, etc. is not needed, so that the number of steps can be reduced and the cutter blade can be formed even more easily.

EMBODIMENTS

Figure 1:
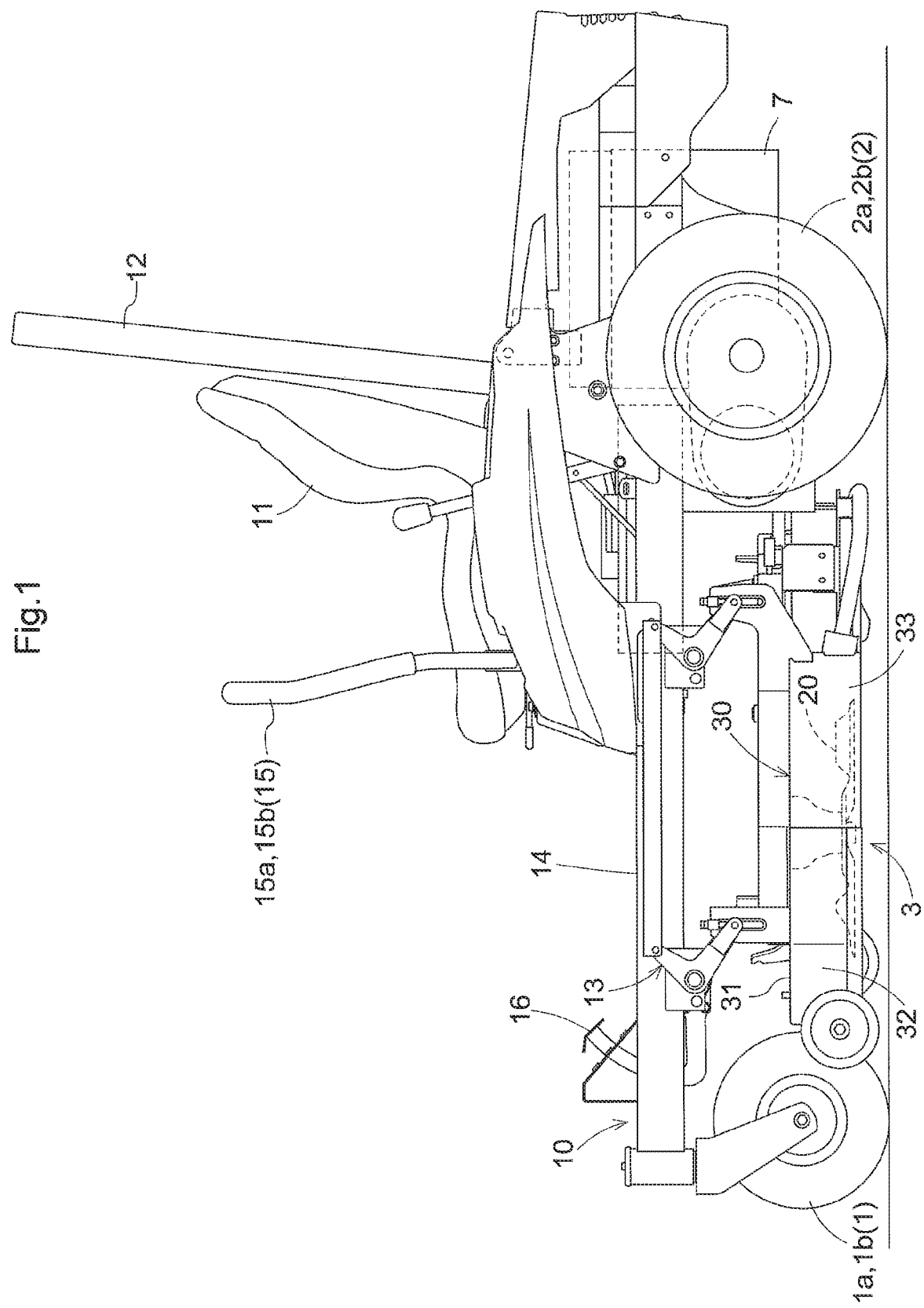
FIG. 1 is a side view showing one example of an electric grass cutting machine to which the inventive cutter blade for a mower is applicable.

Next, embodiments of the present invention will be explained with reference to the accompanying drawings. In this embodiment, a grass cutting machine is a mid-mount type riding electric grass cutting machine. FIG. 1 is a side view of the grass cutting machine. Incidentally, here, unless indicated explicitly otherwise, "front" means the front side with respect to the machine body front/rear direction (traveling direction), and "rear" means the rear side with respect to the machine body front/rear direction (traveling direction). Also, the left/right direction or lateral direction means the machine body transverse direction (machine body width direction) perpendicular to the machine body front/rear direction. And, "upper" or "lower" refers to the positional relation with respect to the perpendicular direction (vertical direction) of the machine body, representing the relation with respect to the ground clearance.

This grass cutting machine, as shown in FIG. 1, includes a front wheel unit 1 consisting of a left front wheel 1a and a right front wheel 1b which are of freely rotatable caster type, a drive wheel unit 2 consisting of a left rear wheel 2a and a right rear wheel 2b, a vehicle body frame 10 supported by the front wheel unit 1 and the drive wheel unit 2, a battery 7 disposed at a rear portion of the vehicle body frame 10, a driver's seat 11 disposed forwardly of the battery 7, a ROPS frame 12 mounted erect from the rear side of the driver's seat 11, and a mower unit 3 suspended from the vehicle body frame 10 to be liftable up/down via a lift link mechanism 13 between the front wheel unit 1 and the drive wheel unit 2 in a space under the vehicle body frame 10.

Forwardly of the driver's seat 11, there is provided a floor plate 14 as a "footrest" for the driver, from which a brake pedal 16 protrudes. On the opposed sides of the driver's seat 11, there is disposed a maneuvering unit 15 consisting of a left maneuvering lever 15a and a right maneuvering lever 15b each of which is pivotable about a horizontal pivot axis extending in the vehicle body transverse direction.

Figure 2:
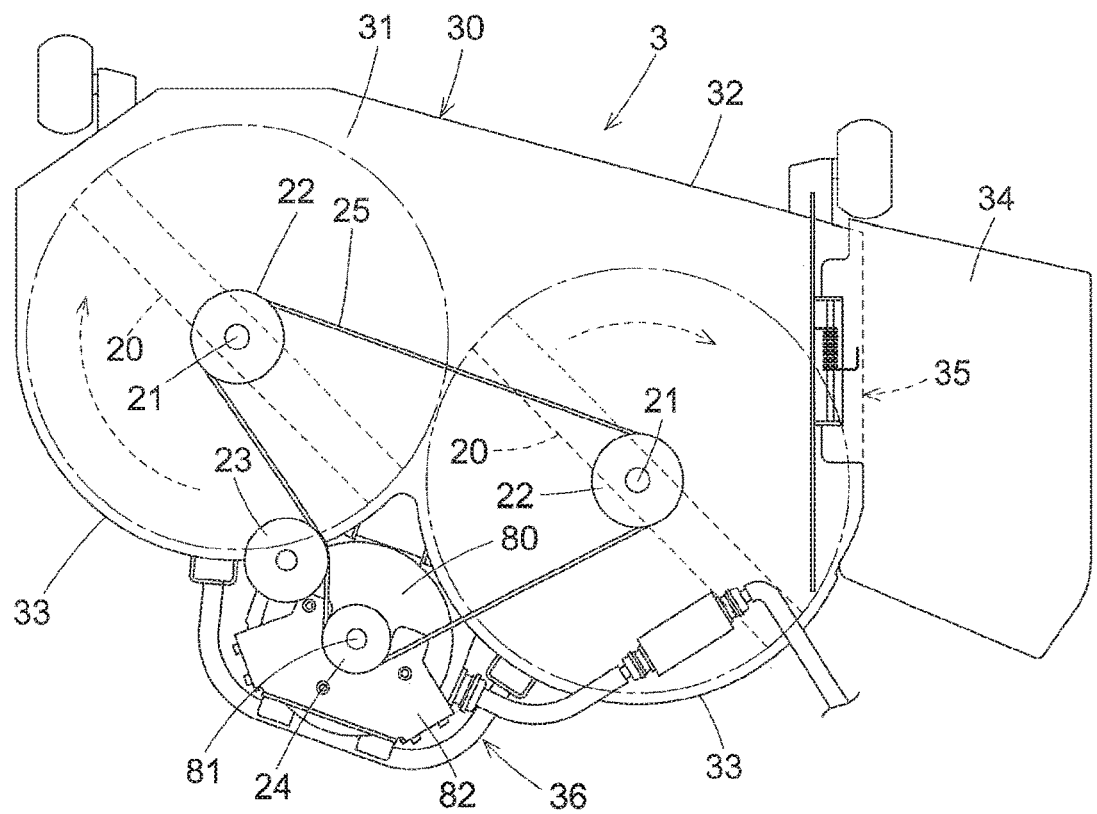
FIG. 2 shows a partial horizontal section of a mower unit.

FIG. 2 shows a partial horizontal section of the mower unit 3. The mower unit 3, as shown in FIG. 2, includes a mower housing 30 and two rotary type cutter blades 20. The left cutter blade 20 and the right cutter blade 20 are disposed side by side along the vehicle body transverse direction. The mower housing 30 includes a top plate 31 and a front side plate 32 and a rear side plate 33 which extend downwards from the outer circumferential edge of the top plate 31. The front side plate 32 is joined with the outer circumferential edge on the front side of the top plate 31 and the rear side plate 33 is joined with the outer circumferential edge on the rear side thereof. Right end areas of the front side plate 32 and the rear side plate 33 are cut out, thereby to create a cut grass discharge opening 35 covered with a cover 34. Each cutter blade 20 is disposed in an inside space of the mower housing 30 created by the top plate 31, the front side plate 32 and the rear side plate 33.

Rotational shafts 21 extending downwards through the top plate 31 of the mower housing 30 are rotatably supported to the top plate 31 via bearing units (not shown). Each cutter blade 20 is releasably fastened and fixed at the lower portion of the vertically extending rotational shaft 21 with an attachment bolt. To the upper end of the rotational shaft 21, an input pulley 22 is attached.

As shown in FIG. 2, a mower motor 80 for feeding power to the cutter blades 20 is mounted on a mount deck 36 that protrudes rearwards from the rear side plate 33. An output shaft 81 of the mower motor 80 is rotatably supported via a bearing under a vertical posture inside a motor housing 82, with an upper end of the output shaft 81 protruding from the motor housing 82. To this protruding portion of the output shaft 81, an output pulley 24 is attached.

A belt 25 is wound around the input pulleys 22 attached to the two rotational shafts 21, an output pulley 24 attached to the output shaft 81 of the mower motor 80 and a tension pulley unit 23 attached to the mower housing 30. When the mower motor 80 is driven, each cutter blade 20 is rotatably driven about the vertical axis via the output pulley 24, the input pulley 22 and the rotational shaft 21.

Figure 3:
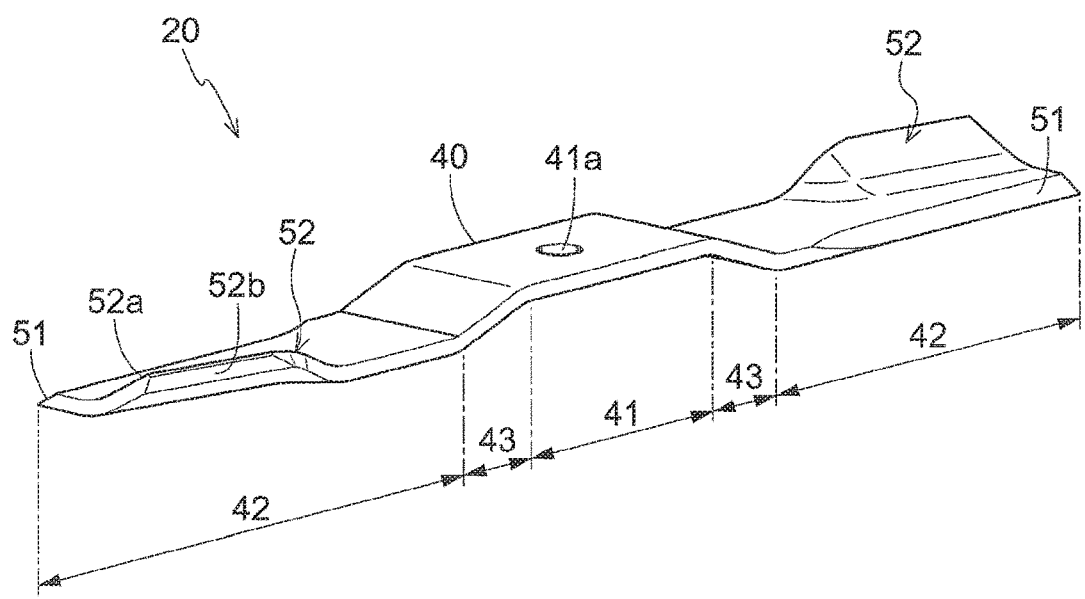
FIG. 3 is a perspective view of the cutter blade.
Figure 4:
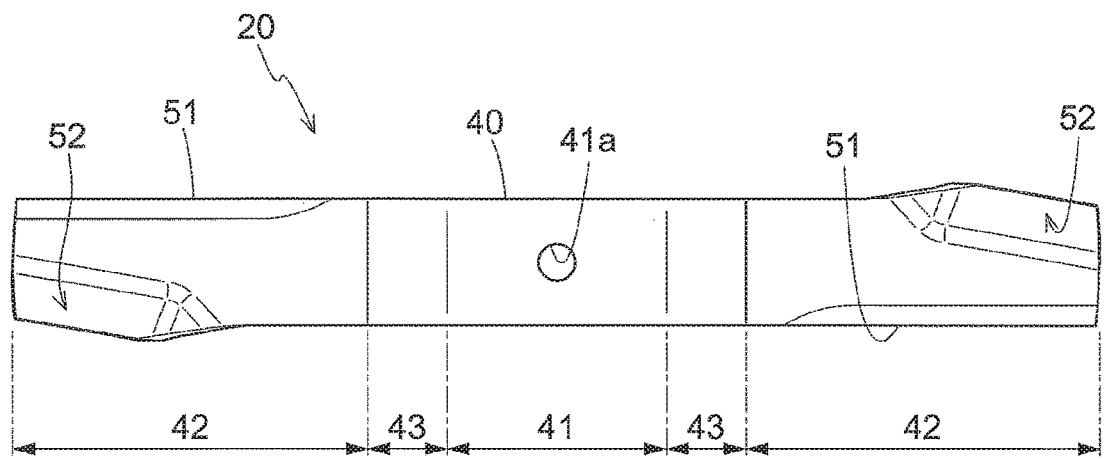
FIG. 4 is a plan view of the cutter blade.

As shown in FIGS. 2 through 4, in this embodiment, the blade body 40 of the cutter blade 20 is in form of an elongate plate, with blade portions 51 and wind generating portions 52 being formed at its opposed longitudinal ends. At time of a grass cutting work, as the grass cutting machine travels with rotation of the cutter blades 20, cut grass pieces cut by the blade portions 51 will be conveyed by a conveying wind generated by the wind generating portions 52 of the cutter blades 20 to be guided to a baffle plate inside the mower housing 30 and passed through the inside of the mower housing 30 and eventually discharged from the cut grass discharge opening 35 to the laterally outer side of the mower housing 30.

As shown in FIG. 3 and FIG. 4, the blade body 40 of the cutter blade 20 includes, along the longitudinal direction thereof, a first portion 41 provided on the center side of the blade body 40 and defining a hole portion 41*a* in which the rotational shaft 21 is mounted, a pair of second portions 42 provided on the opposed sides of the first portion 41 and each having the blade portion 51 and the wind generating portion 52 formed thereon, and a pair of third portions 43 each formed between the first portion 41 and the respective second portion 42 corresponding thereto. The height position of the first portion 41 is set higher than the height portion of the second portion 42, and the third portion 43 is inclined to be positioned progressively lower from the first portion 41 toward the second portion 42.

At the respective second portion 42 of the blade body 40, at its opposed longitudinal ends of the blade body 40, the blade portion 51 is formed at its rotational direction-wise front end portion and the wind generating portion 52 is formed at its rotational direction-wise rear end portion.

Figure 5:
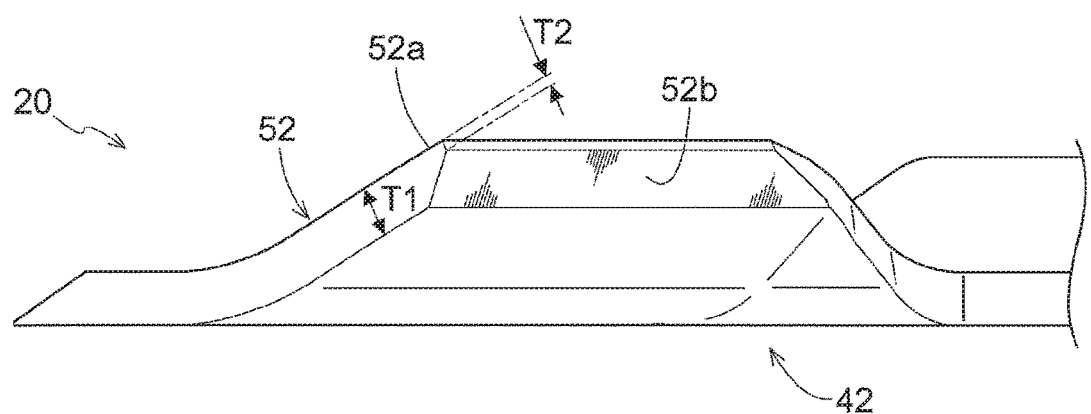
FIG. 5 is an enlarged view showing wind generating portions of the cutter blade.

As shown in FIG. 3 and FIG. 5, each wind generating portion 52 is formed by a portion of the second portion 42 being bent to rise to extend upwardly of the blade portion 51 and also to the rotational direction-wise rear side.

The cutter blade 20 is formed by e.g. punching out a steel plate. In the instant embodiment, the blade body 40, the blade portions 51 and the wind generating portions 52 are constituted integral with each other. With this arrangement, in comparison with a case wherein the blade body 40, the blade portions 51 and the wind generating portions 52 are formed separately, the number of machining steps can be reduced as there is no need for a step of welding, etc., so that the cutter blade can be formed more easily.

As shown in FIG. 5, in the instant embodiment, in each wind generating portion 52 of the blade body 40 (see FIG. 4), a thickness T2 at its rotation direction-wise rear end portion is smaller than a thickness T1 of the remaining portion of the wind generating portion 52. More particularly, in the wind generating portion 52, from a position distant by a predetermined distance from the rotation direction-wise rear end portion, there is formed a tapered portion 52*a* having an inclined face 52*b* which becomes thinner toward the rotational direction-wise rear end of the wind generating portion 52. Further, in this embodiment, the inclined face 52*b* is formed as a flat face or a curved face. The method of forming this tapered portion 52*a* is not particularly limited. But, this may be formed by e.g. trimming the rotation direction-wise rear end portion of the wind generating portion 52. Needless to say, other forming method than the trimming method, such as pressing, etc. maybe employed also.

As shown in FIG. 3 and FIG. 5, in the instant embodiment, the inclined face 52*b* is provided at the lower face portion of the wind generating portion 52. If the inclined face were provided at an upper face portion of the wind generating portion 52, this would result in decrease in the height of the wind generating portion 52 in the vertical direction, which in turn would lead to reduction in the size of the wind generating portion 52, eventually reduction in its ability to raise grass or convey cut grass pieces. In order to prevent this, it is needed to increase the wind amount by further increasing the height of the wind generating portion 52. This would present inconvenience of necessity to implement a design change for the desired increase of the height of the wind generating portion 52 in the vertical direction. Then, by providing the inclined face 52*b* at a lower face portion of the wind generating portion 52, it is possible to prevent reduction in the height of the wind generating portion 52 in the vertical direction, namely, reduction in the size of the wind generating portion 52. Thus, it is possible to avoid reduction in the amount of the wind generated by the wind generating portion 52, without need for such design change described above.

Further Embodiments

Next, further embodiments added with modifications made to the foregoing embodiment will be illustrated. In the further embodiments as follows, a plurality of such further embodiments can be combined as long as no contraction results from such combinations. Incidentally, the scope of the present invention is not limited to the contents of the respective embodiments.

(1) In the foregoing embodiment, there was explained an example in which in the blade body 40, at the opposed longitudinal ends of this blade body 40, the blade portions 51 are formed at their respective rotational direction-wise front end portions. However, the blade portion 51 may be formed at least a part of the rotational direction-wise front end portion of the blade body 40. For instance, it may be provided at a position closer to the center than the opposed ends of the blade body 40.

(2) In the foregoing embodiment, there was explained an example in which in the blade body 40, at the opposed longitudinal ends of this blade body 40, the wind generating portions 52 are formed at their respective rotational direction-wise rear ends. However, the wind generating portion 52 may be formed at least a part of the rotational direction-wise rear end portion of the blade body 40. For instance, it may be provided at a position closer to the center than the opposed ends of the blade body 40.

Figure 6:
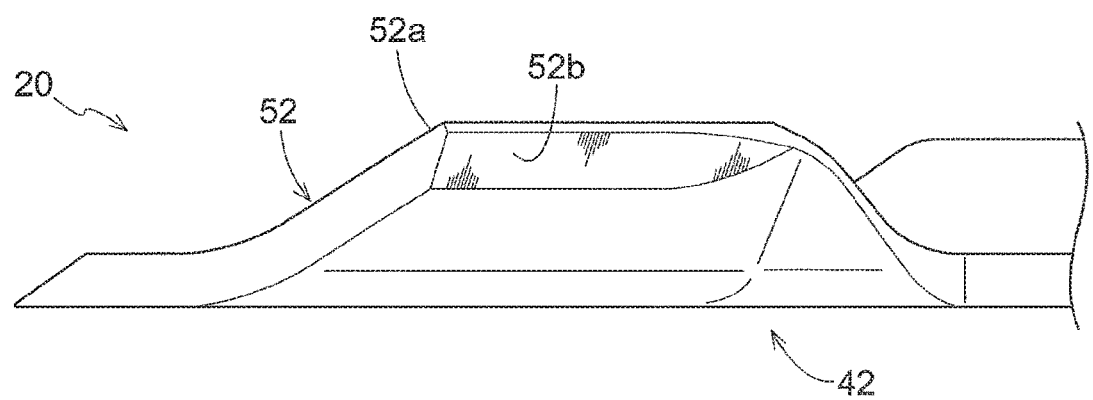
FIG. 6 is a view showing a cutter blade relating to a further embodiment.

(3) In the foregoing embodiment, there was explained an example in which in the respective wind generating portion 52 of the blade body 40, its entire thickness at the rotational direction-wise rear end portion is smaller than that of the remaining portion of the wind generating portion 52. However, the wind generating portion 52 may be formed thinner at its part at the rotational direction-wise rear end portion than the remaining portion. For instance, as shown in FIG. 6, in the wind generating portion 52, a part of the longitudinal end portion of the blade body 40 (see FIG. 4) at the rotational direction-wise rear end portion may be formed thinner than the remaining portion.

(4) In the foregoing embodiment, there was explained an example in which the inclined face 52*b* is formed at the lower face portion of the wind generating portion 52. However, the inclined face 52*b* may be formed at the upper face portion of the wind generating portion 52.

Figure 7:
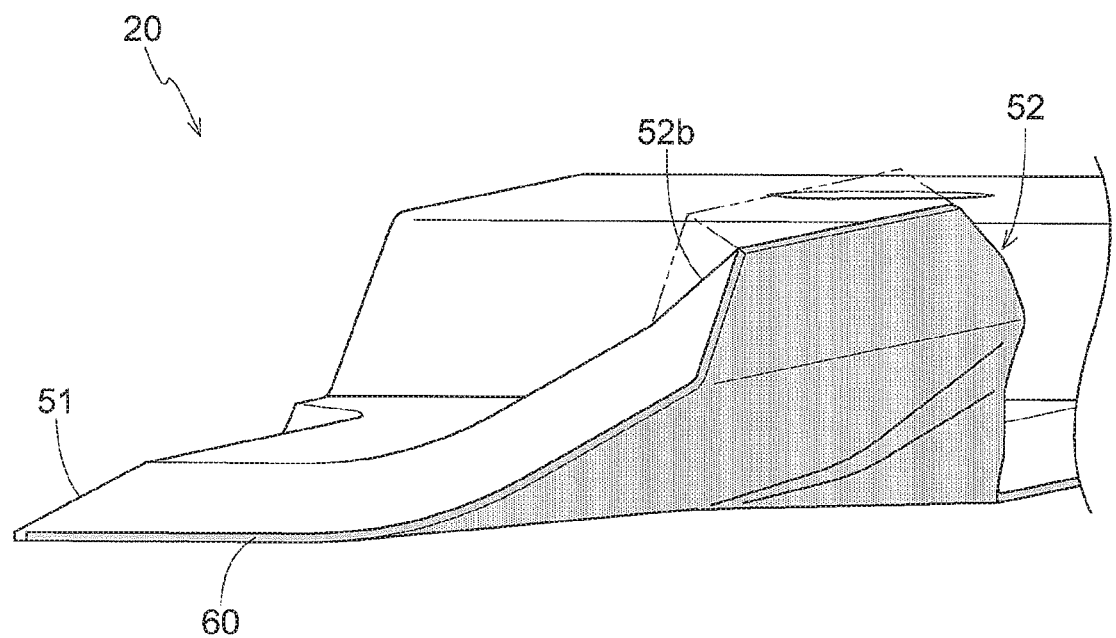
FIG. 7 is a view showing a cutter blade relating to a further embodiment.

(5) As shown in FIG. 7, at a lower face portion of the blade body 40 (see FIG. 4) and at least at a part of a lower face portion of the blade portion 51 and a lower face portion of the wind generating portion 52, there may be provided a high strength portion 60 constituted of a material having a higher strength than material of the blade body 40. In this case, by forming the inclined face 52*b* on the upper face side of the wind generating portion 52 opposite to the face where the high strength portion 60 is provided, it becomes unnecessary to form such inclined face 52*b* in the high strength material constituting the high strength portion 60. Here, since such high strength material is relatively hard to machine, the formation of the inclined face 52*b* will become difficult. Further, even if machining of the high strength material is possible, a portion of the high strength material is to be removed for formation of the inclined face 52*b*. Thus, there will arise inconvenience of improvement of durability due to the high strength material becoming impossible at the machined portion. In contrast, in case the inclined face 52*b* is formed on the upper face side of the wind generating portion 52, there is no need to form the inclined face 52*b* in the high strength material. Therefore, occurrence of such inconvenience as described above can be prevented.

(6) In the foregoing embodiment, there was explained an example of a rear discharge type grass cutting machine having two cutter blades 20. However, the present invention is not limited thereto. For instance, the present invention is applicable also to a grass cutting machine other than the above-described grass cutting machine, such as a grass cutting machine having three cutter blades 20, or a grass cutting machine having one cutter blade 20. Also, the present invention is not limited to the rear discharge type grass cutting machine. The invention may be applied to a grass cutting machine of a side discharge type, a mulching type grass cutting machine, other than the grass cutting machine described above.

(7) In the foregoing embodiment, there was explained an example of the mid mount type electric grass cutting machine. However, the present invention is not limited to the foregoing embodiment. For instance, it may be applied to a grass cutting machine other than the grass cutting machine described above, such as a front mount type grass cutting machine, etc. Moreover, the prime mover may not be an electric motor. Instead, a grass cutting machine may employ an internal combustion engine.

INDUSTRIAL APPLICABILITY

The present invention is applicable to a cutter blade of a mower.

DESCRIPTION OF SIGNS

20: cutter blade
30: mower housing (housing)
40: blade body
41: first portion
42: second portion
43: third portion
51: blade portion
52: wind generating portion
52*a*: tapered portion
52*b*: inclined face
60: high intensity portion

The invention claimed is:

1. A cutter blade configured to be disposed inside a housing of a mower and rotatably driven about a vertical axis, the cutter blade comprising:
   a blade body;
   a blade portion provided at least at a part of a rotational direction-wise front end portion of the blade body; and
   a wind generating portion provided at least at a part of a rotational direction-wise rear end portion of the blade body, the wind generating portion extending more upwards than the blade portion,
   wherein the wind generating portion comprises a tapered portion having an inclined face, the inclined face extending upwards and is inclined downward toward a rotational direction-wise rear end portion, and the blade portion is inclined so as to approach a lower face portion of the blade body as it approaches the rotational direction-wise front end portion of the blade body,
   wherein a thickness of the wind generating portion at the rotational direction-wise rear end portion is smaller at least partially than a thickness of the remaining part of the wind generating portion,
   wherein the blade body, the blade portion, and the wind generating portion are formed integral,
   wherein the blade body includes: a first portion provided on a center side of the blade body; a pair of second portions provided on opposed sides of the first portion, the pair of second portions including the blade portion and the wind generating portion; and a pair of third portions both provided between the first portion and the corresponding second portion, and
   wherein a height position of the first portion is higher than a height position of the second portion, and the third portion is inclined downward from the first portion toward the second portion.

2. The cutter blade of claim 1, wherein the inclined face becomes thinner from a position distant by a predetermined distance from the rotational direction-wise rear end portion to the rotational direction-wise rear end of the wind generating portion.

3. The cutter blade of claim 2, wherein the inclined face comprises a flat face or a curved face.

4. The cutter blade of claim 2, wherein the inclined face is provided at a lower face portion of the wind generating portion.

5. The cutter blade of claim 2, wherein:
   at the lower face portion of the blade body and at least at a part of a lower face portion of the blade portion and a lower face portion of the wind generating portion, there is provided a high strength portion constituted of a material having a higher strength than material of the blade body; and the inclined face is provided at an upper face portion of the wind generating portion.

6. The cutter blade of claim 1, wherein the second portion is longer than the first portion in a longitudinal direction of the blade body.

* * * * *